(12) United States Patent
Segers et al.

(10) Patent No.: US 7,040,882 B2
(45) Date of Patent: May 9, 2006

(54) WATER-INJECTED SCREW-TYPE COMPRESSOR

(75) Inventors: Jozef Maria Segers, Lier (BE); Kris Roger Irene Vercauteren, Kruibeke (BE)

(73) Assignee: Atlas Copco Airpower, Vilrijk (BE)

( * ) Notice: Subject to any disclaimer, the term of this patent is extended or adjusted under 35 U.S.C. 154(b) by 0 days.

(21) Appl. No.: 10/467,335

(22) PCT Filed: Mar. 6, 2002

(86) PCT No.: PCT/BE02/00029

§ 371 (c)(1),
(2), (4) Date: Dec. 10, 2003

(87) PCT Pub. No.: WO02/070901

PCT Pub. Date: Sep. 12, 2002

(65) Prior Publication Data

US 2004/0071578 A1   Apr. 15, 2004

(30) Foreign Application Priority Data

Mar. 7, 2001   (BE) ................................ 2001/0151

(51) Int. Cl.
*F01C 1/16* (2006.01)
*F03C 2/00* (2006.01)
(52) U.S. Cl. .................. 418/201.1; 418/97; 418/98
(58) Field of Classification Search ............. 418/97, 418/98, 201.1; 384/280, 907.1
See application file for complete search history.

(56) References Cited

U.S. PATENT DOCUMENTS

| | | | | |
|---|---|---|---|---|
| 4,566,810 A | * | 1/1986 | Yoshioka et al. | 384/280 |
| 4,960,643 A | * | 10/1990 | Lemelson | 384/907.1 |
| 5,059,038 A | * | 10/1991 | Domes | 384/907.1 |
| 5,083,873 A | * | 1/1992 | Momose et al. | 384/280 |
| 5,224,782 A | * | 7/1993 | Miwa et al. | 384/907.1 |
| 5,762,424 A | * | 6/1998 | Harris et al. | 384/280 |
| 6,093,009 A | * | 7/2000 | Jacks, Jr. | 418/201.1 |
| 6,302,667 B1 | * | 10/2001 | Timuska et al. | 418/201.1 |
| 6,312,239 B1 | * | 11/2001 | Kirsten | 418/201.1 |

FOREIGN PATENT DOCUMENTS

| | | |
|---|---|---|
| DE | 25 11 127 A | 9/1976 |
| DE | 197 44 466 A | 4/1999 |
| EP | 0 410 074 A | 1/1991 |
| FR | 2 721 356 A | 12/1995 |
| WO | WO 99/13224 | 3/1999 |

* cited by examiner

*Primary Examiner*—Theresa Trieu
(74) *Attorney, Agent, or Firm*—Bacon & Thomas, PLLC

(57) ABSTRACT

A water-injected screw-type compressor element including a housing limiting a rotor chamber in which two cooperating rotors are arranged which, by means of axle ends, are beared with both extremities in water-lubricated slide bearings provided in the housing. Bearing bushes are fixedly provided on the axle ends and are directly turnable in a bearing case formed in the housing. The bearing bushes have uninterrupted internal and external surfaces.

9 Claims, 3 Drawing Sheets

WATER-INJECTED SCREW-TYPE COMPRESSOR

BACKGROUND

This invention relates to a water-injected screw-type compressor element, comprises a housing limiting a rotor chamber in which two cooperating rotors are arranged which, by means of axle ends, are beared with both extremities in water-lubricated slide bearings which are provided in the housing and are provided with bearing bushes.

Such screw-type compressor element can deliver oil-free compressed air. Water is injected into the rotor chamber for cooling, lubrication and sealing.

SUMMARY

The slide bearings, too, are lubricated with water, such that oil or grease is banned from the screw-type compressor element and complex sealings for separating oil or grease from the injected water are avoided.

In comparison to oil-lubricated slide bearings, the carrying power of water-lubricated slide bearings, however, is restricted due to the low viscosity of water.

Slide bearings can be of the hydrostatic as well as of the hydrodynamic type.

For counterbalancing radial forces, in a screw-type compressor in the first place hydrodynamic slide bearings are used. In this application, hydrostatic slide bearings are less suited, on account of the fact that the direction of the radial force may change in function of the load and working conditions of the screw-type compressor. Moreover, radial hydrostatic slide bearings are rather complex, as the chambers for the hydrostatic pressure and the feeding channels situated there must be provided all around the bearing.

The counterbalancing of axial forces can take place by means of hydrostatic as well as hydrodynamic slide bearings.

With hydrodynamic slide bearings, the bearing capacity is determined by the peripheral speed of the axle in the bearing, the size and play thereof and the viscosity of the lubricating agent, in this case, water.

This bearing capacity is important, in consideration of the fact that it determines, amongst others, the minimum number of revolutions of the compressor and, thus, the minimum quantity of air which can be delivered, with a given dimension of the bearing and a given working pressure of the compressor, mostly between 7 and 13 bar or more.

The larger the peripheral speed, the larger the effective liquid pressure in the bearing. With a given rotational speed, a larger diameter results in a larger peripheral speed and at the same time a larger effective surface. Increasing the diameter thus contributes in two manners to the increase of the carrying power of the bearing.

Experience has shown that the width of the bearing, however, is limited to approximately the diameter. A larger width leads to an inclined positioning, which rather has a negative influence on the carrying force of the bearing.

The play in the bearing is, for example, 0,001 times the diameter with a tolerance of 0,0002 times the diameter. Too small a play can cause jamming, as then the liquid film may break, which results in a larger friction and heating-up. Too large a play in its turn then causes a difficult production of the liquid film.

Thus, the tolerance on the designed play must be small, preferably 0,0002 times the diameter.

During the acceleration at starting and the running out of the bearing, an occasional contact between the rotating and the fixed parts of the slide bearing may be caused. As water has a low viscosity, it is necessary to bring a self-lubricating material, for example, synthetic material, into the bearing, or to manufacture the whole bearing from such material.

In known screw-type compressor elements, for forming the slide bearings, bushes are pressed into bored openings in the housing. These bushes either consist of metal upon which a layer of synthetic material is provided, or of a thin-walled layer of synthetic material.

The disadvantage of both types of bushes consists in that the tolerance on the bushes is rather large, mostly about a factor 10 too large, such that, without taking special provisions, the play of the bearing is not under control and the bearing can not work in a hydrodynamically optimum manner.

In order to avoid these large tolerances, it is known to apply carbon bushes.

Carbon bushes can be realized with small tolerances and, moreover, have excellent emergency running properties compared to metal. They also have a low extension coefficient and do not absorb water, as a result of which they are dimensionally very stable. They also are chemically inert.

Carbon bushes, however, have to be thick-walled and may only be subjected to little tension. Therefore, they mostly are pressed into the bore opening of the bearing.

This, however, has the disadvantage that the effective bearing diameter is restricted, as carbon bushes have to be thick-walled and the center distance between the male and female rotors determines the largest-possible diameter of the bearing.

Also, due to a common effect of deviations at the bore opening in the bearing housing, at the outer diameter and at the bore opening of the carbon bush, the dimensions of the final bore opening of the bearing may show too large deviations in respect to the nominal dimensions. With thick-walled carbon bushes, this problem will manifest itself less, however, it is not desirable to press-in such carbon bushes, as the thick wall strongly restricts the effective bearing diameter and, thus, also the capacity of the bearing.

The present invention aims at providing a water-injected screw-type compressor element which does not show the above-mentioned disadvantages and whereby the construction of the slide bearings is simple and the play and capacity of the bearing are optimum.

According to the invention, this aim is achieved in that said bearing bushes are fixedly provided at the axle ends and directly rotatable in a bearing case which is formed in said housing.

As there are no more tolerances effecting together which might cause major dimensional deviations, the play of the bearing is optimum. Also, the diameter of the bearing can be chosen as large as possible, such that an optimum bearing capacity can be obtained.

Moreover, these bearing bushes can be realized as a cylinder without grooves or channels for the water supply such that the bearing bushes have uninterrupted internal and external surfaces, as this was the case with classical water-lubricated slide bearings, such that they are easier to manufacture.

Due to the absence of grooves or channels, also the radial position of the bearing bush does not have to be taken into consideration, such that mounting also is simplified in comparison to classical water-lubricated slide bearings.

Preferably, said bearing bushes are made of carbon.

In other forms of embodiment, the bearing bushes are manufactured of other materials, such as other synthetic materials or ceramic material.

In still another form of embodiment, the bearing bushes consist of the same material as the rotors with which they cooperate. In that case, the rotors may form one piece with the corresponding bearing bushes.

Said bearing bushes can be fixed on the axle ends by pressing, glueing or axial clamping or by a combination of two or more of these techniques.

DETAILED DESCRIPTION OF VARIOUS EMBODIMENTS

With the intention of better showing the characteristics of the invention, hereafter, as an example without any limitive character, preferred embodiments of a water-injected screw-type compressor element according to the invention are described, with reference to the accompanying figures, which schematically represent embodiments of such water-injected screw-type compressor elements.

Figure 1:
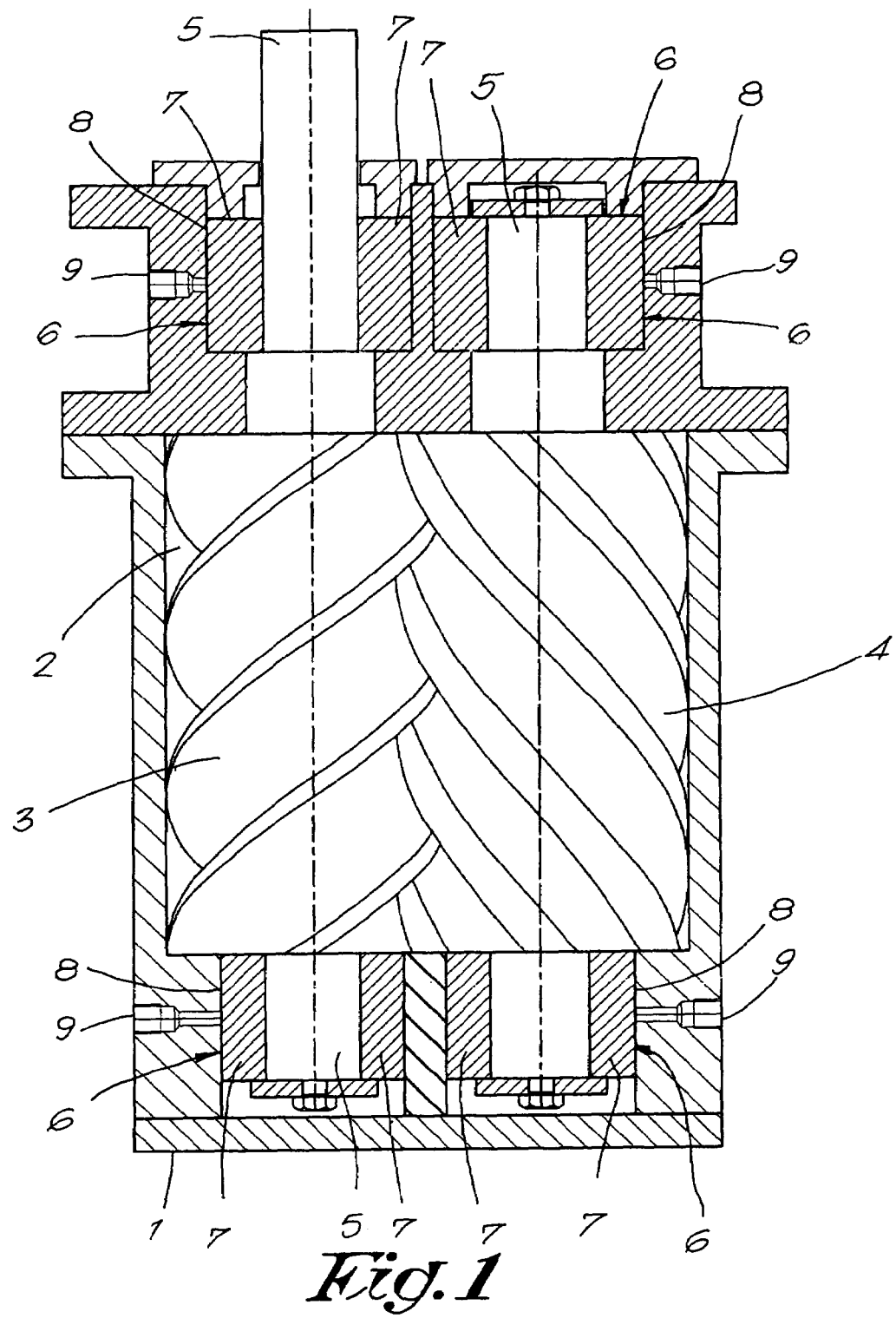
FIG. 1 shows a cross-sectional elevational view of an embodiment of the invention.

As represented in FIG. 1, the water-injected screw-type compressor element according to the invention comprises a housing 1 limiting a rotor chamber 2. In this rotor chamber 2, a male rotor 3 and a female rotor 4 are situated, which each are provided, on each extremity, with axle ends 5 which are beared in slide bearings 6.

Each of the slide bearings 6 includes of a bearing bush 7 of carbon which is fixedly pressed onto the corresponding axel end 5 and which is rotatable in a bearing case 8 which is formed by a part of the housing 1 of the compressor element.

In the housing 1, opposite to each of the bearing bushes 7, one or more water injection points 9 are provided.

The bearing bushes 7 do not necessarily have to be pressed onto the axle ends 5. They can also be glued or axially clamped onto the axle ends 5 or be fixed at the axle ends 5 by means of a combination of two or more of the aforementioned techniques, to wit pressing, glueing and clamping.

The radial clamping or radial press fit must be minimum in order to prevent that the carbon bearing bushes 7 are subjected to tension and that the outer diameter of the carbon bearing bushes 7 is altered too strongly.

In the housing 1, opposite to each

As represented in FIG. 1 the water-injected screw-type compressor element according to the invention comprises a housing 1 limiting a rotor chamber 2. In this rotor chamber 2, a male rotor 3 and a female rotor 4 are situated, which each are provided, on each extremity, with axle ends 5 which are beared in slide bearings 6.

The radial clamping or radial press fit must be minimum in order to prevent that the carbon bearing bushes 7 are subjected to tension and that the outer diameter of the carbon bearing bushes 7 is altered too strongly.

Figure 2:
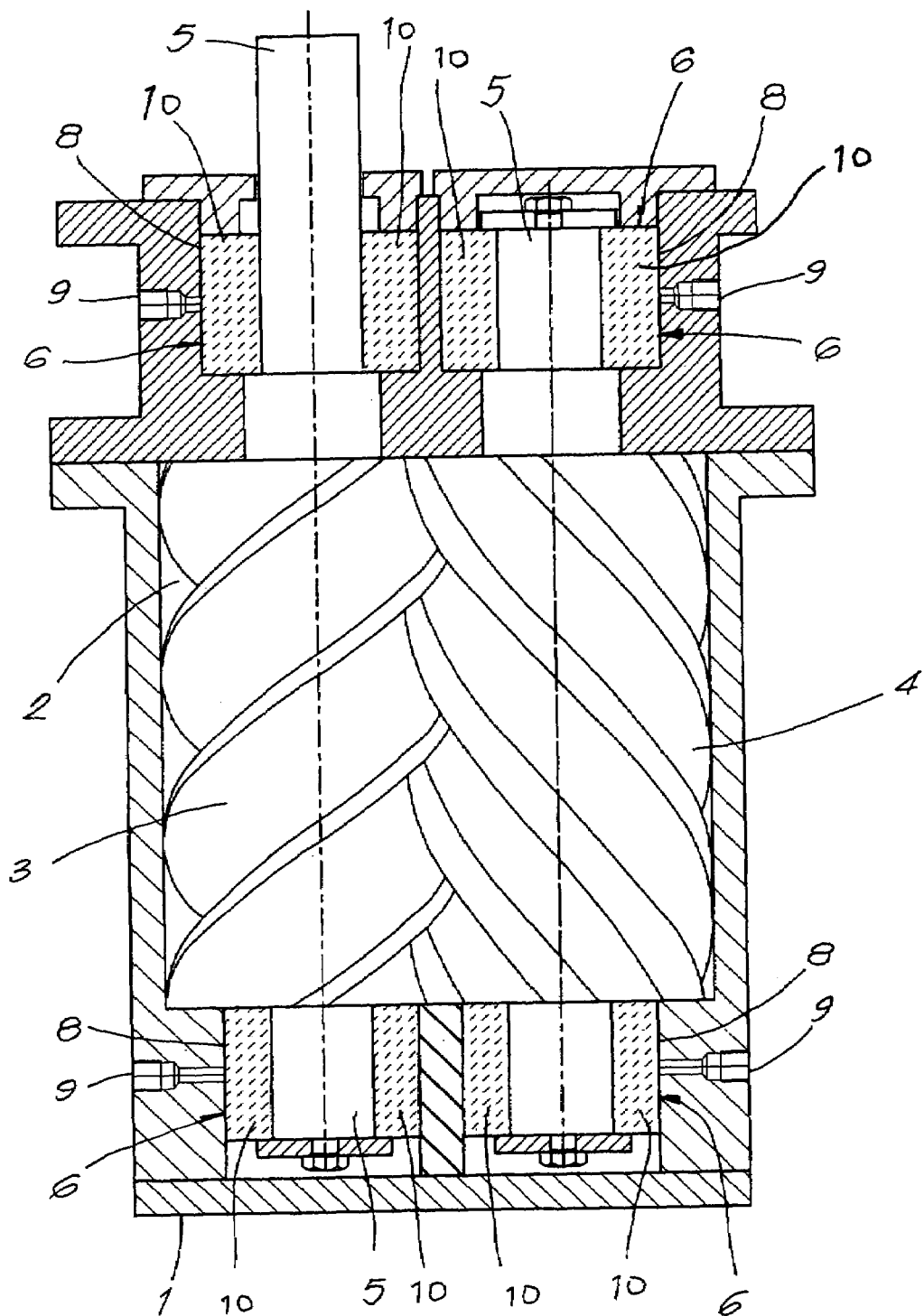
FIG. 2 shows a cross-sectional elevational view of another embodiment of the invention.
Figure 3:
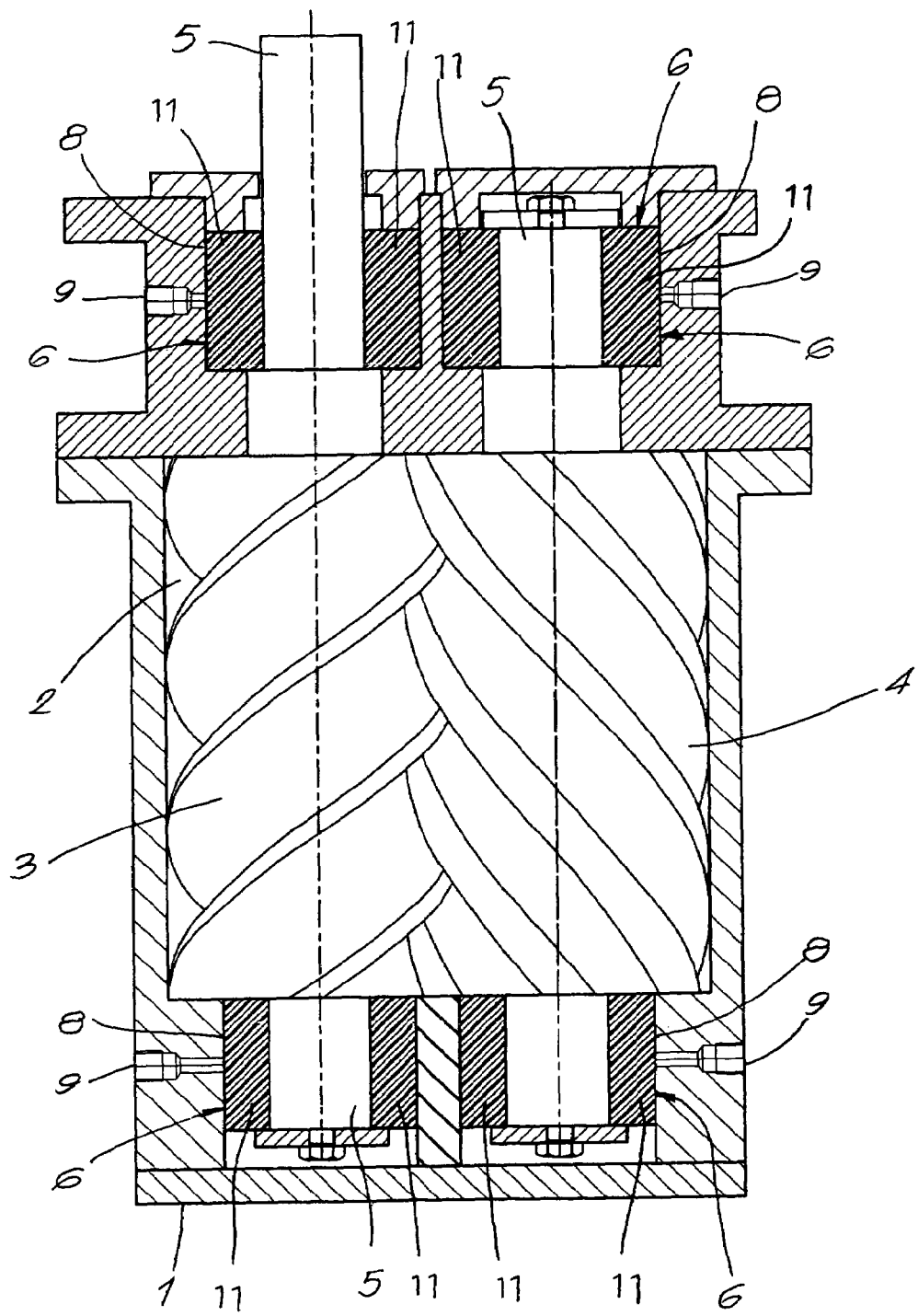
FIG. 3 shows a cross-sectional elevational view of yet another embodiment of the invention.

As illustrated in FIGS. 2 and 3, the bearing bushes 7 do not necessarily have to comprise of carbon. FIG. 2 shows bearing bushes 10 that are constructed of a synthetic material, or in the alternative, FIG. 3 shows bearing bushes 11 that are constructed of a ceramic material 7.

They may also include the same material as the axle ends 5 and, thus, as the rotors 3 and 4. In this case, the bearing bushes 7 may be manufactured in one piece with the rotors 3 and 4, for example, by injection moulding.

To the compressor element, a suction conduit, pressure conduit and injection conduit for water are connected which give out in the rotor chamber 2. The rotors 3 and 4 are driven by a motor, not represented in the Figure.

The invention is in no way limited to the form of embodiment described heretofore and represented in the Figure appended hereto, on the contrary may such screw-type compressor element be realized in different variants, without leaving the scope of the invention.

The invention claimed is:

1. Water-injected screw-type compressor element, comprising a housing limiting a rotor chamber in which two cooperating screw rotors include axle ends beared with both extremities in water-lubricated slide bearings which are provided in the housing, wherein bearing bushes are fixedly provided on the axle ends and are directly turnable in a bearing case formed in said housing, said bearing bushes having uninterrupted internal and external surfaces.

2. Water-injected screw-type compressor element according to claim 1, wherein said bearing bushes are made of carbon.

3. Water-injected screw-type compressor element according to claim 1, wherein said bearing bushes are made of synthetic material.

4. Water-injected screw-type compressor element according to claim 1, wherein said bearing bushes are made of ceramic material.

5. Water-injected screw-type compressor element according to claim 1, wherein the bearing bushes are made of the same material as the rotors with which they cooperate.

6. Water-injected screw-type compressor element according to claim 1, wherein the rotors are formed in one piece with the corresponding bearing bushes.

7. Water-injected screw-type compressor element according to claim 1, wherein the bearing bushes are fixed on the axle ends by pressing, glueing or axial clamping or by a combination of two or more of these techniques.

8. Water-injected screw-type compressor element according to claim 1, wherein the housing defines water injection points in communication with the external surface of the bushings.

9. Water-injected screw-type compressor element according to claim 1, wherein the bearing bushes are rotatable with the axle ends.

* * * * *